June 27, 1939. P. SPORN ET AL 2,164,182
PROTECTIVE SYSTEM FOR ELECTRIC POWER TRANSMISSION LINES
Filed July 13, 1937 4 Sheets-Sheet 1

INVENTORS
Philip Sporn
Charles Albert Muller
BY S. Michael Prieles
ATTORNEYS.

Patented June 27, 1939

2,164,182

UNITED STATES PATENT OFFICE 2,164,182

PROTECTIVE SYSTEM FOR ELECTRIC POWER TRANSMISSION LINES

Philip Sporn, Brooklyn, and Charles Albert Muller, Tuckahoe, N. Y., assignors to General Electric Company, a corporation of New York Application July 13, 1937, Serial No. 153,421

12 Claims. (Cl. 175—294)

This invention relates to protective systems for electric power transmission lines, and this application is a continuation in part of our application Serial No. 52,012, filed November 29, 1935, upon which Patent No. 2,087,127 issued on July 13, 1937, and some of the features of the present invention are disclosed in our copending application Serial No. 584,936, filed January 6, 1932, upon which Patent No. 2,087,126 issued on July 13, 1937.

It is among the objects of the invention to provide a fast and positively acting carrier protective system whereby on occurrence of a fault on an electric power transmission line, only the faulty section will be cut out of the system, leaving the remainder of the system intact and stable, while preventing faulty tripping under abnormal conditions that have effects similar to those accompanying a fault on the section, such as the reversal of the power flow in the line section that may occur upon the opening of circuit breakers on an external faulty line section, or due to out-of-step conditions which occur when synchronous apparatus in different parts of the system fall out of step with each other.

The foregoing and other objects of the invention will be best understood from the following description of exemplifications thereof, reference being had to the accompanying drawings, wherein.

Figure 1:
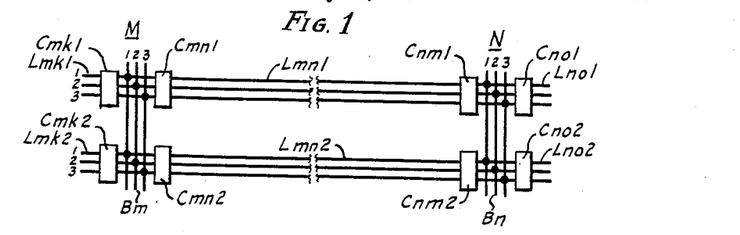
Fig. 1 is a diagrammatic view of a typical part of an electric power transmission line system.

In Fig. 1 is shown a part of a typical alternating current transmission line system operating, for instance, at 60 cycles, including line stations M, N, provided with bus-bars $Bm$, $Bn$, respectively. A two-circuit three-phase high voltage line extends between these stations. Two three-phase line sections $Lmk1$ and $Lmk2$, each comprising three phase high voltage conductors 1, 2, 3, coming from an adjacent similar station K enter station M, being connected through circuit breakers $Cmk1$ and $Cmk2$ to the bus-bars $Bm$ of station M; transmission line sections $Lmn1$ and $Lmn2$ extend between stations M and N and are connected to the bus-bars $Bm$, $Bn$ at said stations through circuit breakers $Cmn1$, $Cmn2$, $Cnm1$, $Cnm2$; and two transmission line sections $Lno1$ and $Lno2$ leading to further stations are connected through circuit breakers $Cno1$ and $Cno2$ to the bus-bars $Bn$ of station N. The two circuits of the line are thus formed of individual line sections that may be each separately cut out so that in case of failure of one circuit line section, the entire load may be carried on the remaining circuit line section if it is left intact.

In large interconnected electric power systems fed with power at a plurality of spaced points, the requirements for positive continuity of service to all power consuming points makes the maintenance of system stability of paramount importance. The stability of a power line system depends on speedy and positive elimination of short-circuits and similar faults from the system. To this end the system is divided into line sections interconnected by circuit breakers provided at the ends of the sections. To maintain the stability of the system without disturbing the continuity of the service, it is essential that the circuit breakers at the ends of a line section shall stay closed and keep each line section in operation if the fault lies outside the line section, and to secure speedy tripping of the circuit breakers at both ends of a line section if a fault occurs on the line section. Such protective systems are described in our article in the Electrical World published September 10, 1932, in New York, and disclosed in our copending application Serial No. 716,798, filed March 22, 1934, which is a continuation in part of our previously mentioned copending application Serial No. 584,936, and they are satisfactory if operating in conjunction with circuit breakers which on tripping complete the break of the circuit connection within 6 to 8 cycles.

The increase of the requirements for system stability brought about the construction of circuit breakers which have greater opening speed and which are able to completely break the circuit connection in about 3 cycles or less. The present invention provides a protective relay system for operating at a much higher speed than those known heretofore and able to actuate the tripping circuit of the circuit breakers of a faulty section in 1 cycle only or less, so that in combination with the high-speed circuit breakers opening the circuit within about 3 cycles or less, a power line system will be cleared from a faulty section within about 3 to 4 cycles after the occurrence of a fault.

Before proceeding with a detailed description of several embodiments of the protective relaying system exemplifying the invention as actually installed on a section of a transmission line system, its principles will be explained by reference to simplified schematic single line diagrams of the relaying equipment at one station end of a section as shown in Figs. 2 to 6, an exactly similar equipment being provided at the other end of the protected section.

Figure 2:
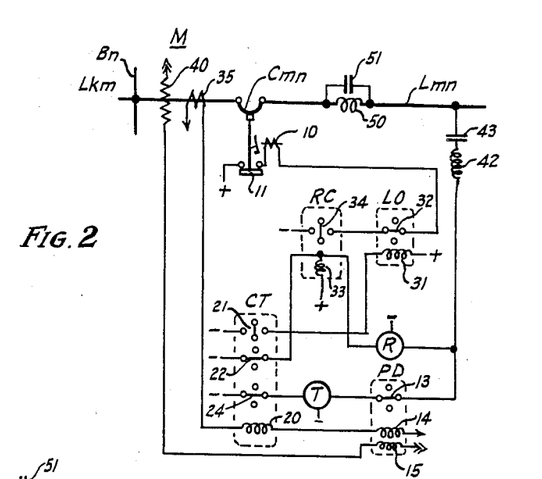
Figs. 2, 3, 4, 5 and 6 are diagrammatic views of protective systems illustrating various protective arrangements based on the principle of the invention.

Referring to Fig. 2, a transmission line section which is to be protected has its opposite ends connected to the transmission line by circuit interrupters $Cmn$ which lead to the station bus-bar $Bm$ in the station M located along the electric power transmission line. The circuit interrupter is shown arranged to be opened by a tripping coil 10 connected through an auxiliary switch 11 which opens with the circuit breaker to de-energize the tripping coil when the circuit breaker is opened. In order to effect opening of the interrupter on occurrence of a fault, the tripping circuit which is supplied from a suitable source, indicated by plus and minus signs, is arranged to be completed by trip means in the form of a relay RC arranged to keep the tripping circuit opened under normal operating conditions and to complete the tripping circuit only when the circuit interrupter is to be tripped for disconnecting the line section from the line.

The trip means RC, for which various kinds of devices may be used, is indicated in the form of a simple relay with trip contacts 34 arranged to be actuated either to an open non-tripping condition or to a closed trip condition by controlling the energization of the actuating winding or coil 33. The trip means relay RC is normally restrained in its non-trip condition by fault responsive means, such as a local energizing circuit which holds the relay contacts 34 open when its actuating coil 33 is energized from a local source, such as a station battery, through contacts 22 of a fault responsive relay CT which serves as a fault detector and has an actuating winding 20 energized in accordance with the line conditions by its connection to the line current transformer 35.

The fault responsive relay CT operates as a fault detector and, as shown, holds its contacts 22 closed during normal operating condition to prevent opening of the interrupter, but opens its contacts 22 practically instantaneously and cuts off the local energy supply to trip relay coil 33 on the occurrence of a fault on the line, so as to permit the trip relay contacts 34 to close the trip circuit and effect speedy opening of the interrupter, as required in the event the fault occurs on the protected line section $Lmn$. The contacts 22 of the fault responsive relay CT operate thus to control the restraining action of the local actuating circuit in preventing the opening and effecting the opening of the interrupter.

The operation of the trip means relay RC in completing the trip circuit is also subjected to an additional selective trip restraining or blocking action which insures that the relay RC does not assume its trip condition, but remains in a non-trip condition in which it prevents the opening of the interrupter in the event the fault that occurred on the line is outside the protected line section $Lmn$.

This selective trip restraining or blocking action may be secured by providing at each section end an oscillation transmitter T and an oscillation receiver R arranged to supply to the trip relay RC blocking energy which prevents it from assuming the tripping condition, the operation of the transmitter being started upon the occurrence of a fault and selectively controlled in accordance with the location of the fault within or outside the protected line section.

As shown in Fig. 2, such oscillation transmitter T and receiver R of each station may be suitably coupled through a tuning inductance 42 and a coupling condenser 43 to one of the transmission line conductors $Lmn$, and oscillation traps formed of an inductance 50 and a condenser 51 provided at each section end confine the transmitted oscillations within the protected line section. As described in connection with Figs. 7 and 8, such transmitter T may have an oscillation valve which is normally prevented from oscillating by applying a suitable bias potential to a control electrode of the valve through fault responsive means such as the normally closed contacts 24 of the fault detector relay CT arranged to open and start oscillations upon the occurrence of a fault. In addition, the operation of the oscillation transmitter T is subjected to the selective control action of a directional relay PD provided with current windings 14 and voltage windings 15 which are energized by the current transformer 35 and a voltage transformer 40 in accordance with the direction of the energy flow in the line to prevent transmission of oscillations if the fault is within the line section irrespective of the oscillation control action of the fault responsive relay CT at its bias applying contacts 24. To obtain maximum speed in clearing a faulty line, the directional relay is shown provided with normally closed contacts 13 arranged to open and instantaneously stop transmission on the occurrence of a fault if, and only if, the energy flows into the line section, but to remain closed and permit transmission of carrier oscillations if the line energy flows out from the protected section.

Although the relaying arrangement described above will secure extremely fast and positive disconnection of a faulty line section while preventing the disconnection of a sound line section on the occurrence of an external fault, interconnected power transmission lines are often exposed to abnormal conditions that would affect such relay arrangement in much the same way as an internal fault in the line section although no such fault has actually occurred. Such abnormal faults may be caused by the reversal of the power flow in the line section that may occur upon the opening of the circuit breakers on an external faulty line section. In such case the protected section would be without carrier energy due to reversal of the directional relay means at both stations, while the tripping means still remain in the closed position, thus casing tripping of a sound line section.

Similar abnormal fault conditions may also occur at times when synchronous apparatus in different parts of the system fall out of step. Such loss of synchronism has at first the appearance of an external three-phase fault which increases in magnitude until the synchronous apparatus at the ends of the line approach a condition of phase opposition, whereupon the fault condition assumes the character of an internal fault until it again changes its appearance to that of an external fault in the opposite direction. These cyclical swings of power will repeat themselves for each slip cycle of the synchronous equipment connected to the opposite ends of the line section, the duration of such cycle varying between a second or several seconds depending on the system conditions.

We have found that faulty tripping due to such abnormal line conditions is eliminated by combining a carrier relaying arrangement of the type described above with means which are actuated upon occurrence of a fault so as to prevent the opening of the circuit interrupter by the carrier controlled trip means if the interrupter opening means have not been actuated to open within a predetermined short time after the occurrence of a fault.

In the exemplification of the invention shown in Fig. 2, such time delayed opening preventing action is secured by a lockout means arranged to prevent the operation of the opening means a short time after the occurrence of a fault if, during the elapsed time, the opening means has not been actuated to effect the opening of the circuit interrupter. In the arrangement shown in Fig. 2, the lock-out means is made in the form of a lock-out relay LO having contacts 32 connected in the tripping circuit in series with the contacts 34 of the receiver relay trip means RC and an actuating winding 31 which is energized by a circuit through normally open contacts 21 of the line energized fault detector relay CT.

The lock-out relay LO is arranged to operate so that it shall sufficiently delay the opening of the tripping circuit to permit the carrier controlled relaying arrangement to operate the opening means for opening the interrupter if the fault occurs on the line section, and so that it should open its normally closed contacts 32 before a circuit interrupter on the system operating at the fastest speed could interrupt the fault; and the resetting of the relay after it opens should be delayed long enough to prevent false tripping on out-of-step conditions and also to permit the relays which have been actuated upon the occurrence of a fault to resume their normal position.

We have found in actual experience that with the available circuit breakers and relaying equipments, lock-out relays arranged in the way shown in Fig. 2 opening with a time delay of about 4 to 6 cycles and resetting with a time delay of about 3 to 5 cycles will prevent false tripping under all abnormal fault conditions, such as cases of power reversal and out-of-step conditions, while enabling operation of the carrier relaying arrangement at its highest speed in clearing a faulty section in case of an actual internal fault.

With a protective system such as described in connection with Fig. 2, the completion of the tripping circuit for effecting a circuit opening operation is determined by single relay means, namely, the trip means RC that are subjected to the restraining action of a local circuit through a set of contacts of an instantaneously acting fault detecting relay CT which removes the restraining action on the occurrence of a fault to bring about fast tripping by the trip relay means RC if the fault occurs on the protected section. The completion of the tripping operation by the trip relay means RC is, however, subjected to independent restraining action of the oscillation channel which is selectively actuated on the occurrence of a fault in accordance with the direction of the energy flow in the line to permit transmission of carrier energy to the trip relay and prevent tripping if the fault is outside the protected line section, but to prevent transmission and assure fast interrupter opening if the fault is within the protected line section.

The operation of such a system is as follows:

Under normal power flow conditions, the fault responsive relay CT at each section end will have its contacts 22 and 24 closed, thus completing the local trip restraining circuit to the trip relay means RC, preventing the opening of the interrupter at each section end, and completing the transmission restraining bias circuit to the transmitter, whereby to prevent transmission of oscillations from each transmitter.

In the event of an external fault on the line, for instance, to the right of station N, abnormal fault energy will flow at station M from the busbar Bm into the line section and at station N from the line section into the bus-bar Bn. As a result the fault detector relay CT at each station end will instantaneously actuate its contacts 22 to remove the local trip restraining action exerted on the trip means RC so as to permit tripping at each station, while at the same time the instantaneously actuated fault detector contacts 24 remove the transmission restraining bias from the local transmitter T to start the transmission of oscillations from each station for restoring the trip restraint.

At station M the abnormal energy inflow from the bus Bm into the line section Lmn effects instantaneous actuation of the directional relay PD to prevent by its contacts 13 the local transmitter T from transmitting oscillations notwithstanding the removal of the transmission preventing bias by the local fault detector relay contacts 24. However, at station N the energy outflow from the line section Lmn out into the bus Bn actuates the directional relay PD to leave its contacts 13 in the normal position to permit the transmitter T, which has been started by the bias removing fault detector contacts 24, to transmit energy to the receivers R at stations M as well as N and cause the receivers R at both stations M and N to hold the local trip relay means RC in the open non-trip condition and prevent opening of the interrupters Cmn and Cnm at both station ends of the section. The protected line section Lmn thus remains connected in the line notwithstanding the flow of fault energy to an external fault.

If, however, an internal fault occurs on the line section Lmn, abnormal fault energy will flow into the line section from both ends of the section. As a result, the fault detector relay CT at each section end will, as before, instantaneously actuate its contacts 22 to remove the local trip restraining action on the trip means RC so as to permit quick interrupter tripping at each section end, while at the same time the practically instantaneously actuated fault detector contacts 24 remove the transmission restraining bias from the local transmitter T to start transmission of oscillations from each station for restoring the trip restraint. However, since the abnormal fault energy is now flowing into both ends of the line section to the point of the internal fault, the directional relays PD at both stations will be practically instantaneously actuated to stop the transmission from the transmitters T at both stations M, N, thus rendering ineffective the trip restraining action of the transmitters T and permitting the trip means RC at both section ends to complete quickly the tripping of the associated interrupters. The faulty section is thus quickly disconnected from the transmission line.

The lock-out relays LO at the two section ends do not affect the practically instantaneous protective action of the other relay means of the system because the time delay of these relays is larger than the time required to clear the fault.

Actual experience with carrier relaying arrangements equipped with lock-out relays arranged and correlated in the way described herein establish their reliability in securing fast tripping on the occurrence of an internal fault and preventing false tripping on the occurrence of an external fault which effects the relays of the protected systems in a way similar to an internal fault, such as out-of-step conditions and power reversal due to external faults.

To illustrate a variety of other ways for combining carrier relaying arrangements with lock-out means of the type described in Fig. 2, there are shown in Figs. 3 to 6 modifications of the relay arrangement of Fig. 2.

Figure 3:
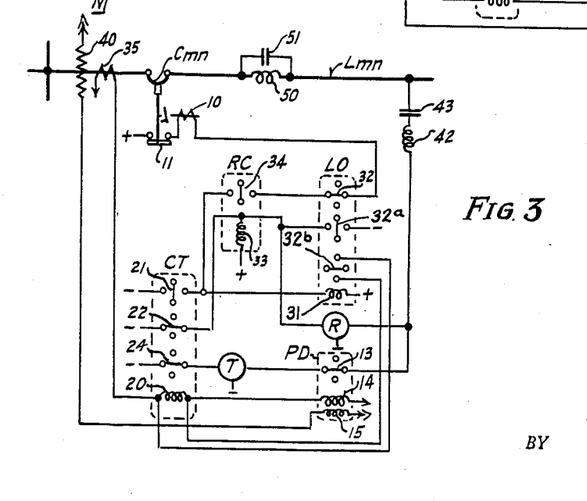

In the relaying system of Fig. 3, the time-action lock-out relay LO has, in addition to the normally closed contacts 32 which open the tripping circuit to tripping coil 10 upon the energization of its actuating winding 31, two sets of contacts 32a and 32b which are actuated to close or open in response to the condition of the energization of the actuating winding 31. As shown in Fig. 3, the contacts 32a control an additional actuating circuit to the winding 33 of the receiver relay RC so that when the contacts 32a are actuated to close after a predetermined time delay, the receiver relay is independently actuated to prevent tripping.

The third set of contacts 32b of the lock-out relay LO are shown connected to the terminals of the actuating winding 20 of the fault detector relay CT so that when the contacts 32b are closed by the actuation of the winding 31, the actuating winding 20 of the fault detector relay will be short-circuited, whereupon it will resume its normal operating condition in which the opening of the interrupter is prevented.

In the exemplification of the invention shown in Fig. 3, the normally open contacts 21 of the fault detector relay which control the actuation of the lock-out relays upon the occurrence of a fault are also included in series with the contacts 34 of the receiver relay means RC holding normally open the tripping circuit and closing only upon the occurrence of a fault. On the occurrence of a fault, both the contacts 21 of the line energized fault responsive relay as well as the contacts 34 are practically instantaneously actuated to close and complete the circuit. Thus, the use of the two serially connected sets of contacts in the tripping circuit does not delay fast tripping action in case of an internal fault.

The operation of the arrangement of Fig. 3 is otherwise the same as the operation of the arrangement of Fig. 2.

Figure 4:
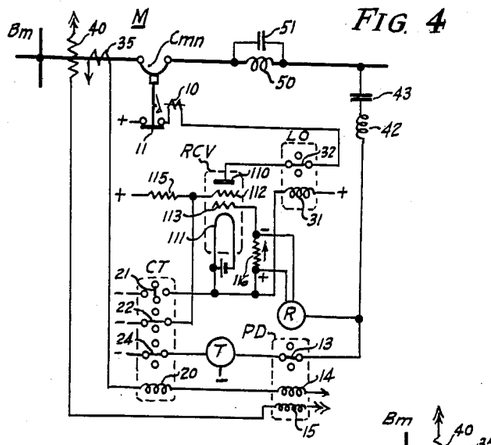

The modification of the invention shown in Fig. 4 is similar to that of Fig. 3 except that instead of using a standard relay RC for controlling the opening of the interrupter through the tripping circuit, a space discharge valve RCV is connected in the tripping circuit for controlling the completion of the tripping circuit, subject to the conjoint control action of the local energizing circuit through the contacts 22 of the local fault detector relay CT and the carrier energy supply from the remote station under the control of the contacts 13 of the directional relay at the remote station, or its own station.

The space discharge valve may be of any suitable type and, as shown, is provided with an anode 110 connected in series with the contacts of the lock-out relay 32 to the circuit leading to the tripping coil 10 and a hot cathode 111 connected to the local energizing source through the normally opened contacts 21 of the fault detector relay CT. The current flow between the anode 110 and the cathode 111 is normally prevented by the action of the control electrode 112, such as a grid which is connected through a resistance 115 to a source of positive potential and is normally biased through the lead over the contacts 22 of the fault detector relay to normally prevent flow of current between the anode 110 and the cathode 111 but to permit current flow between the anode and the cathode when the blocking bias is removed by the opening of the contacts 22 of the fault detector relay CT upon the occurrence of a fault on the line. The second control electrode 113 of the valve RCV is connected through a biasing circuit including a resistor 116 to the receiver R so that when one of the transmitters T transmits and supplies carrier energy to the receiver R, the control electrode 113 prevents a current discharge through the receiver RC, but does not itself impede the completion of the tripping circuit to the trip coil 10 when carrier energy is not received by the associated receiver R.

The action of the discharge valve RCV is thus in every respect similar to that of the action of the receiver relay RC in the exemplification of the invention shown in Figs. 2 and 3.

Figure 5:
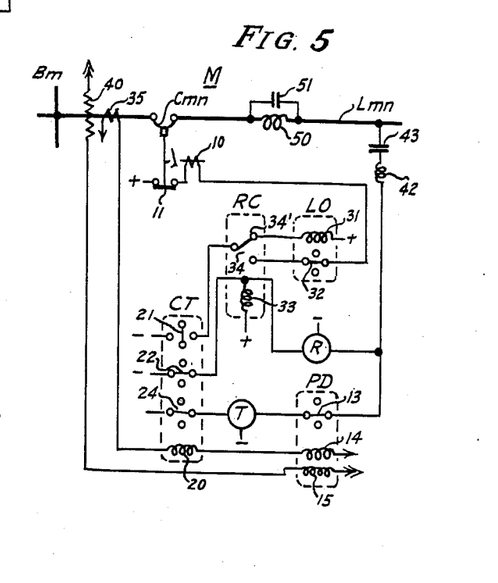

In the modified arrangement of the invention shown in Fig. 5, the lock-out relay LO is arranged to operate under the conjoint control action of the fault detector relay CT as well as the carrier channel through the receiver relay RC. To this end the receiver relay RC is provided with two sets of contacts 34 and 34' and the energizing circuit for the lock-out relay 31 leads over the contacts 34' of the receiver relay and the normally open contacts 21 of the fault detector relay CT. As a result, the lock-out relay LO is energized only if the fault detector relay CT is actuated upon the occurrence of a fault to close its contacts 21, and the receiver relay is simultaneously energized by carrier energy to complete at its contacts 34' the energizing circuit to the winding 31 of the lock-out relay LO. As a result, the lock-out relay cannot open unless the receiver relay is in the non-tripping position and a fault did not occur on the line section.

Such lock-out relay may be provided with a target indicating the actuation of the relay and since such lock-out relay operates only on a through fault, the target will indicate that carrier was received and clarifies the cause of the fault, thus enabling the operator to recognize that a fault occurred and to ascertain the cause of the fault that actuated the relays.

The relay arrangement shown in Fig. 5 is in this respect superior to that of Figs. 2 to 4 because in these arrangements the lock-out relays are actuated to open in all cases when the fault detector operates on the occurrence of a fault.

Figure 6:
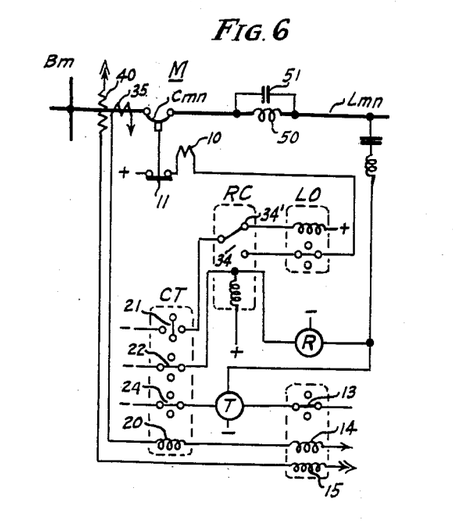

The modification of the invention shown in Fig. 6 is essentially the same as that of Fig. 5 except that the control of the transmitter operation by the directional relay means is effected not through the control of the plate circuit of the transmitter, but through contacts 13 which are connected in a blocking circuit to a separate blocking grid electrode of the transmitter valve similar to the blocking grid electrode to which a blocking bias is applied by the normally closed contacts 23 of the fault detector relay.

The operation of the systems shown in Figs. 3 to 6 is obvious from the description of the operation of the arrangement of Fig. 2 hereinabove.

The relay arrangements described above will also secure the same fast selective protection for line sections which are fed only from one end, and it may employ other signal transmitting means for selectively controlling the operation of the interrupter means.

Similarly, various kinds of devices and relays may be combined into a protective system operating in accordance with the principles of the invention. One of the great advantages of the protective system of the invention resides in the fact that it lends itself for the protection of standard power transmission lines under the utilization of relays and devices long known for great reliability in construction and performance. To illustrate such practical application of the invention, there are described below two types of protective systems exemplifying our invention, by giving in connection with each exemplification a detailed description of the protective equipment of a transmission line system indicated by Fig. 1 as applied to the connection of the end of a line section $Lmnl$ to the bus-bars $Bm$ at station $M$ by circuit breaker $Cmnl$. The line section $Lmnl$ is a part of a single circuit line including the line sections $Lmkl$ and $Lnol$. The protective equipment for each line connection at these stations is exactly like that used in connection with the circuit breaker $Cmnl$ as described below.

Figure 7:
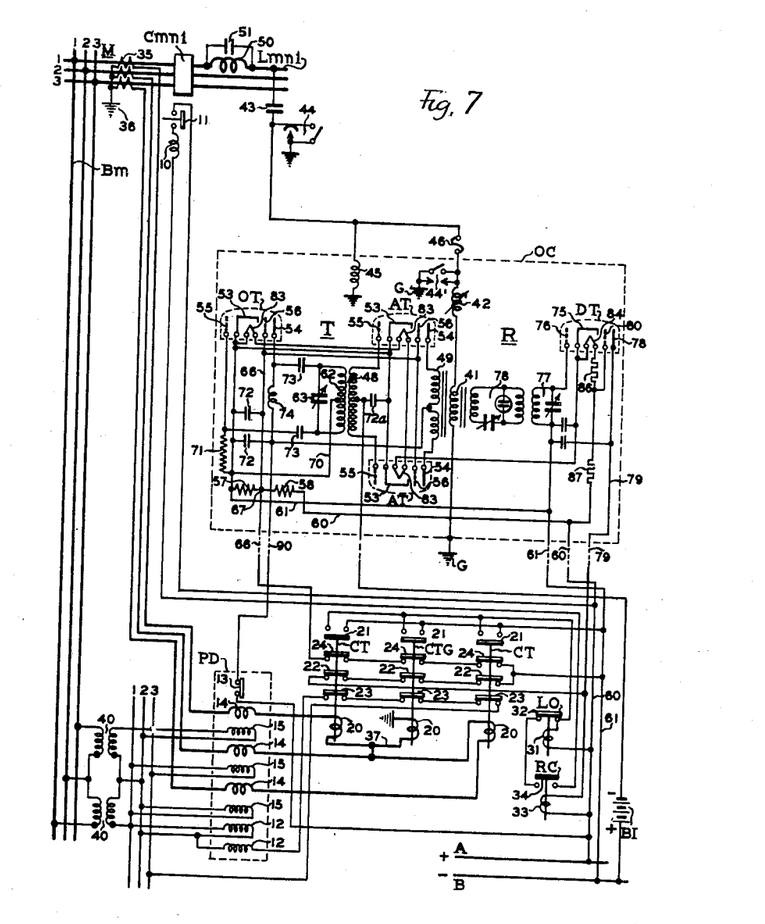
Figs. 7 and 8 are diagrammatic views of the protective equipment at an individual station of a protected line section illustrating exemplifications of the invention.

In the type of protective system of our invention shown in Fig. 7, the high voltage circuit breaker $Cmnl$ connecting the three line conductors 1, 2 and 3 of section $Lmnl$ to the busses $Bm$ consists of three separate oil circuit breaker units arranged to be actuated in common. The circuit breaker is of a type which opens a short-circuit on the line in a very short time, in about 3 cycles or less, such circuit breakers having been found to give reliable operation under severe conditions. The circuit breaker has a tripping coil 10 which trips the breaker when energized by current from a suitable source, such as the station control battery indicated by bus-bars A and B. The tripping coil 10 is connected in series with an auxiliary switch 11 and its circuit is opened with the circuit breaker to de-energize the tripping coil when the circuit breaker is open.

The relay system for each station is preferably mounted on a switchboard panel inside the station building. It comprises an instantaneous line energized power directional relay PD which has two voltage restraint coils 12 and which is arranged to be actuated to close its contacts 13 upon flow of power in the direction from the line section $Lmnl$ into the bus-bars $Bm$, and to open its contacts 13 in case the power flows in the opposite direction from the bus-bars $Bm$ through the circuit breaker $Cmnl$ into the line section $Lmnl$. The power directional relay PD has three current coils 14 and three voltage coils 15, the three sets of voltage and current coils acting inductively on suitably mounted discs to turn them in one or the opposite direction, depending on the direction of power flow corresponding to the currents and voltages applied to the actuating coils 14 and 15. The voltage restraint coils 12 are energized from phase to phase voltages in such a manner as to hold contacts 13 closed, regardless of the direction of power flow in the line section, provided the magnitude of the current has not exceeded a predetermined value. The type IDP polyphase induction power directional relay of the General Electric Company with voltage restraint is suitable for this service. This relay is highly sensitive and operates at less than 1.0 ampere with only 10% of normal voltage and at less than 5.0 amperes with only 3% of normal voltage applied to the potential coil when voltage restraint is removed. It operates at high speed requiring less than ½ cycle to open its contacts and approximately 1 cycle to close its contacts.

The power directional relay PD is directly actuated by the alternating current flowing in the line making its operation fast, positive and reliable.

In the system of protection shown in Fig. 7, the power directional relay PD has only one function, namely to apply plate voltage to the transmitter T when its contacts 13 are closed and to remove plate voltage from the transmitter T when its contacts 13 are open.

There are also provided two line-energized practically instantaneous phase fault relays CT and one similar ground fault relay CTG, each having an actuating current coil 20 arranged to close its contacts 21 and to open its contacts 22, 23 and 24 upon flow of a predetermined current. These over-current relays may be of the plunger type. They are very reliable, easy to maintain and simple. They are fast in operation taking less than ½ cycle to open their contacts and approximately 1 cycle to close their contacts. Their current setting is easily adjustable for any pick-up value and has a 3 to 1 range of adjustment, that is the maximum current setting obtainable is equal to three times the minimum current setting obtainable. Type PQ relays of the General Electric Company and type SC relays of the Westinghouse Company are suitable for this purpose.

The current tripping relays CT and CTG are directly actuated by the alternating current flowing in the line making their operation fast, positive and reliable.

There is also provided a lock-out relay LO having an actuating coil 31 arranged to open its contacts 32 after a predetermined time delay when its coil 31 is energized and to close its contacts quickly when the coil 31 is de-energized. Type PQ time-delay relays of the General Electric Company are suitable for this purpose.

There is further provided an instantaneous-acting receiver tripping relay RC having an actuating coil 33 arranged to open quickly its contacts 34 when its coil 33 is energized, and to close quickly its contacts when the coil 33 is de-energized. The receiver relay RC may be of the electromagnetic hinged-armature type similar to those employed in the telephone art. These relays are very reliable, easy to maintain and simple. They are fast in operation taking less than ½ cycle to open the contacts and less than 1 cycle to close the contacts.

To energize the current coils of the power directional relay PD and the current relays CT, CTG, there is provided a set of three current transformers 35 having the secondary windings connected in star, with the starpoint grounded at 36. The three current coils 14 of the power directional relay PD are connected in the three phase leads of the secondary windings of the current transformers 35, while the coils 20 of two current relays CT are connected in two-phase leads from the current transformers 35. The coil 20 of the ground relay CTG is connected in the neutral grounded return lead 37 of the current transformers.

The voltage coils 15 of the power directional relay PD are energized by two open delta-connected potential transformers 40 having their primary windings connected to the bus-bars B*m* at the station. The phase sequence of the connections of the voltage coils 15 of the power directional relay PD is arranged to secure the proper directional action of the relays in response to the direction of the proper flow.

An essential part of the protective system of each station is the carrier frequency communication equipment which cooperates with the relays mounted on the switchboard. In accordance with our invention, the carrier equipment and all the parts carrying carrier current are left outside the station building and are mounted in a weatherproof outdoor cabinet in the switchyard near the point where the carrier connection to the incoming high voltage line is made. The outdoor cabinet in which the carrier equipment is mounted is indicated in Fig. 7 by a dotted rectangle OC, and its arrangement as used in practice is shown and described in our copending application Serial No. 716,798, filed March 22, 1934.

The carrier equipment of each station is shown comprising a transmitter T and a receiver R which are coupled to the transmission line L*mn*1 through a carrier transformer winding 41 connected in series with a tuning coil 42 and a coupling capacitor 43 between one of the line phases, phase 1, for instance, and ground G, the lead between the capacitor 43 and the tuning coil 42 being protected by gap-switch grounding units 44, 44', a ground-leak coil 45 and a fuse switch 46.

The transmitter T may consist of a master oscillator having a oscillator tetrode OT generating oscillatory carrier currents of a predetermined frequency and supplying its output through a coupling transformer 48 to the input circuit of two push-pull connected amplifier tetrodes AT of a power amplifier which supplies corresponding amplified oscillatory carrier energy through output windings 49 over carrier transformer winding 41, and capacitor 43 to the power line along which the carrier energy is transmitted to the opposite station. A wave trap, comprising an inductance 50 and a capacitor 51 interposed between the circuit breaker C*mn*1 and the connection between coupling capacitor 43 and phase 1 of line L*mn*1, prevents carrier energy from entering the station busses and the adjacent line sections.

The oscillator tetrode OT and the amplifier tetrodes AT have each a hot cathode 53, and anode 54, a control grid 55 and a screen grid 56 which are supplied with suitable direct current potentials through a potentiometer circuit including the resistors 57, 58 connected across leads 60 and 61 extending from the battery bus-bars A, B. The cathodes 53 of the three tubes are interconnected with the common lead 61 from the negative bus-bar B, and the control grids 55 of the amplifier tubes AT receive additional negative bias from an auxiliary source, such as bias battery BI. The oscillator tetrode OT has in its anode circuit a tuned tank circuit including inductance coil 62 and adjustable condenser 63 which determine the frequency of the carrier oscillations.

The screen grids 56 of the three tubes OT and AT are maintained at the proper positive operating potential by a lead 66 connected to the intermediate point 67 of the potentiometer resistors 57, 58. A lead 70 between the tank coil 62 and common lead 61 from the negative busbar B, a grid-leak resistor 71, bypass condensers 72, blocking condensers 73, choke coil 74 complete the circuits of the oscillator tube OT, and a bypass condenser 72a completes the circuits of the amplifier tubes AT.

The carrier receiver R may have a combined detector and amplifier tube DT having a cathode 75 and a control grid 76 connected to a tuned input circuit 77 coupled through an intermediate tuned circuit 78 to the carrier transformer winding 41 for impressing on the input circuit oscillatory carrier currents received over the power line from the opposite station N. The anode 78 and cathode 75 of detector tube DT are connected to an output circuit 79 including the actuating coil 33 of the receiver relay RC for holding the receiver relay contacts 34 open upon reception of carrier from the opposite station N or from local transmitter at station M, screen grid 80 being maintained at the proper potential to secure efficient operation of the detector tube DT.

The three transmitter cathodes 53 and the detector cathode 75 are heated by filamentary heaters 83 and 84, respectively, which are connected in series with each other and in series with resistors 86 and 87 across the leads 60 and 61 from the station battery busses A and B. The detector cathode 75 is maintained at a suitable potential by connecting it to filament 84.

The circuit connections of the detector tube DT maintain it continuously in operative condition so that carrier frequency oscillations of the frequency to which the detector circuit is tuned will be received by the receiver R and produce in its output circuit 79 a current flow sufficient to energize the coil 33 of the receiver relay RC to open its contacts 34 and to keep the contacts open as long as carrier of the proper frequency is received.

The circuit connections of the transmitter tubes OT and AT keep the cathode heaters continuously energized and the tubes are therefore at all times ready to operate. The anodes 54 of the three transmitter tubes OT and AT are connected through a lead 90 over the contacts 13 of the power directional relay PD to the positive battery bus A and are energized only when the contacts 13 are closed. The potentiometer resistors 57 and 58 are so proportioned that when connected in series across the leads 60 and 61 to the battery busses while the anodes 54 are energized by closure of directional relay contacts 13, the control grids and the screen grids of the three transmitter tubes have applied to them potentials which instantaneously set and maintain the master oscillator in an oscillatory condition and cause oscillations to be amplified and impressed over the coupling transformer 41 and the capacitor 43 on the transmission line, transmitting sufficient carrier energy to the opposite station N for actuating its receiver R to open the contacts 34 of the associated receiver relay RC. The several elements of the transmitter circuits are designed to cause the oscillations and the transmission of carrier energy to be instantaneously stopped and to hold the tubes in non-oscillating condition either upon opening the anode supply lead 90 at the directional relay contacts 13, or upon applying a blocking potential to the screen grids 56 of the three transmitter tubes OT and AT, for instance, by short-circuiting the potentiometer resistor 57 through the circuit over the three normally closed sets of contacts 24 of the three current relays CT and CTG.

The details of construction of the transmitter, receiver and the coupling capacitor do not constitute the subject matter of the present invention. They may be of any of the different forms well known in the art in connection with carrier frequency transmission and reception and do not require special modulation of the transmitted high frequency current. For use in the system of protection here described, the carrier equipment must merely meet the following requirements:

(a) No transmission of carrier should take place while contacts 13 of the power directional relay PD are open;

(b) No transmission of carrier should take place while the contacts of all three current relays CT and CTG are closed;

(c) Instantaneous opening of any of the three contacts 24 of the three current relays CT and CTG while contacts 13 of the power directional relay are closed should instantaneously start transmission of carrier to the station at the other end of the line section.

In the system of protection described above, the various elements operate as follows:

The power directional relay PD has only one function, namely, to apply positive plate voltage from the bus-bar A to the anodes 54 of the three transmitter tubes OT, AT when the contacts 13 of the power directional relay are closed, and to remove the plate voltage from the three transmitter tubes when relay contacts 13 are open.

The three current tripping relays CT and CTG are employed for four different functions.

When the current in a line phase or the ground phase has exceeded a predetermined value, one or more of the fault responsive relays CT, CTG has its actuating coil 20 sufficiently energized to open its normally closed contacts 22, 23, 24 within less than ½ cycle and to close its normally open contacts 21, performing the following operations:

(a) The opening of at least one of the normally closed contacts 23 in less than ½ cycle removes the voltage restraint of the power directional relay coils 12, thereby making the power directional relay more sensitive in its response to the magnitude of the power flow in the line section;

(b) The opening of at least one of the normally closed contacts 22 in less than ½ cycle de-energizes the normally energized coil 33 of the receiver relay RC and allows contacts 34, which are normally held open by the energization of the coil 33, to close if no carrier energy is received by coil 33 from the receiver R;

(c) The opening of at least one of the normally closed contacts 24 in less than ½ cycle removes the blocking potential from the screen grids 56 of the three transmitter tubes of the transmitter and allows them to become positive with respect to the cathodes of the transmitter tube, starting instantaneously the generation of carrier energy and its transmission by way of the coupling condenser 43 to the receiver of the station at the other end of the line section if the contacts 13 of the associate power directional relay PD are closed;

(d) The closing of at least one of the normally open contacts 21 within approximately 1 cycle trips the oil circuit breaker $C_{mn}1$ at the associated station if contacts 34 of the receiver relay RC are closed.

The transmitter T at station M transmits carrier energy only when the contacts 13 of the power directional relay PD are closed and one or more contacts 24 of the tripping relays CT and CTG are open. Accordingly, transmitter T at station M will transmit only when the direction of power flow is from line $L_{mn}1$ into bus-bar $B_m$ and the current in line $L_{mn}1$ has reached a predetermined value.

The voltage restraint coils 12 of the power directional relay 13 are energized to hold contacts 13 of the relay normally closed and ready to transmit if any one of the contacts 24 of the fault responsive relays CT, CTG open, provided the direction of the power flow is from the line into the bus of the associated station. Thus, by holding the contacts of the power directional relay normally closed, transmission of carrier is started instantaneously upon opening of any one of the contacts 24 of the three relays CT, CTG.

The actuating coil 33 of the receiver relay RC is normally energized by the closed contacts 22 of the three fault responsive relays CT, CTG connected across the station battery to hold the contacts 34 of the receiver relay normally open. In case the line or ground current exceeds a predetermined value and one of the relays CT, CTG operates to open its contacts 22, thereby de-energizing the battery circuit supplying coil 33 of receiver relay RC, and if no carrier energy is received by coil 33 of the receiver relay, its contacts 34 will close to allow the tripping of the oil circuit breaker $C_{mn}1$ as soon as contacts 21 of any one of the relays CT, CTG close. If carrier energy is received by coil 33 of the receiver relay RC when its local energizing circuit through the current relay contacts 22 has opened, contact 34 of the receiver relay will remain open, thus preventing tripping of the oil circuit breaker $C_{mn}1$.

In order to take care of special fault conditions that occur on some transmission line systems due to a reversal of power flow when a faulty section is disconnected, or due to out of synchronism conditions, there is also provided a lock-out relay LO, which is normally de-energized, and has its normally closed contacts 32 connected in series with the tripping circuit leading over the receiver relay contacts 34 and opens its contact after a time delay of 3 to 6 cycles only upon the energization of its coil 31 by the closure of the tripping contacts 21 of one of the practically instantaneous tripping relays CT, CTG.

Assuming now a single-circuit polyphase transmission line including sections $L_{mk}1$, $L_{mn}1$ and $L_{no}1$ with the circuit breakers at each station equipped as described in connection with Fig. 7 hereinabove, the operation of the system will be as follows: Under normal line conditions the power directional relay PD will have its contacts 13 closed, the current relays CT, CTG will have their contacts 22, 23, 24 closed and contacts 21 open, the lock-out relay will have its contacts 32 closed, and receiver relay RC will have its contacts 34 open. Under these conditions no carrier energy is transmitted at either station.

If a phase to phase fault, such as a short-circuit, occurs on a line section $L_{no}1$ beyond station N, an abnormal current flow will ensue from line section $L_{mk}1$ through line $L_{mn}1$ and the portion of the line section leading from station N to the point of short-circuit on line $L_{no}1$. This abnormal current will immediately actuate at each of the two stations M and N the practically instantaneously-acting fault responsive over-current relay CT and the high speed power directional relay PD.

At station M the power flows from the bus-bar $B_m$ into the line $L_{mn}1$ causing the instantaneous over-current relay CT of line L*mn*l to open its contacts 22, 23, 24 and the power directional relay PD to open its contacts 13, thus preventing transmission of carrier from station M. At the instant contacts 22, 23, 24 on the over-current relays CT open, receiver relay RC is de-energized from the local battery circuit and voltage restraint is removed from the power directional relay PD.

At station N the power flows from the line L*mn*l into the bus-bars B*m* causing the instantaneous over-current relay CT to quickly open its contacts 22, 23, 24 while holding closed contacts 13 of the power directional relay PD. The instant contacts 22 of one of the actuated over-current relays CT at station N open, the local battery circuit of the receiver relay is de-energized, contacts 23 open removing voltage restraint from the power directional relay, and contacts 24 open starting the carrier transmitter at station N. The carrier energy transmitted from station N over power line section L*mn*l will be received practically instantaneously by the receiver at station M and as a result the receiver at station M will energize the actuating coil 33 of the associated receiver relay RC to keep it from closing its tripping contacts 34, thus preventing tripping of circuit breaker C*mn*l. The local tripping circuit at station N is held open because its receiver relay RC is energized by carrier energy from its local transmitter T. The transmitter at station N is quickly started at the very inception of the fault and energizes by carrier flowing over the line section the receiver relay RC at station M to maintain its contacts open.

Tripping of the circuit breakers C*mn*l at station M and C*nm*l at station N is thus prevented by the tripping contacts 34 of the receiver relays RC remaining open at both stations. The line section L*mn*l stays intact.

Should the fault on line section L*no*l be a phase to ground fault, then a ground current will flow from station M through line L*mn*l to station N and through line L*no*l to the fault. The operation of the protective system will be exactly the same as for the phase to phase fault except that the ground fault relay CTG will operate instead of the fault responsive relay CT. If the ground current flowing under such conditions is large enough and flows through one of the phase over-current relays CT, the actuated phase over-current relay CT will operate simultaneously with the ground current tripping relay CTG, setting into action the same sequence of operation as described above.

If a phase to phase fault occurs on the line section L*mn*l between stations M and N, an abnormal current flow will ensue from the bus-bars B*m* at station M and from the bus-bars B*n* of station N into the line section L*mn*l to the point of fault. This abnormal current will immediately cause, at each of the two stations, the actuation of the over-current relays of the affected line conductors and also the high speed power directional relays PD. At both stations contact 13 of the power directional relays PD will open, thus preventing transmission of carrier from either station. Contacts 22 of the over-current relays CT at both stations will open, thereby de-energizing the local actuating circuits of the receiver relays RC, thus causing the tripping contacts 34 of the receiver relay RC of each station to close. Within ½ cycle later tripping contacts 21 of the over-current relay CT at both stations will close, thereby tripping the two circuit breakers C*mn*l and C*nm*l at the two stations and cut out the faulty section L*mn*l.

If a phase to ground fault occurs on the line section L*mn*l between station M and N, then a ground current will flow from the bus-bars B*m* at station M and from the bus-bars B*n* of station N into the line section L*mn*l to the point of the fault. The operation of the system will be exactly similar to that of a phase to phase fault except that the ground current relays CTG at both stations will operate instead of the phase over-current relays CT.

Since the tripping of the circuit breaker is determined by the operation of the receiver relay RC which holds the tripping circuit open at its tripping contacts 34 while energized either through the normally closed contacts 22 of the fault responsive relays or through the control by carrier when the directional relay contacts 13 are closed, the additional use of the parallel connected tripping contacts 21 of the three fault responsive relays for controlling the tripping circuit is optional and may be omitted. In such case the tripping circuit through tripping coil 10 is controlled only by the receiver relay RC, which holds the tripping circuit open when energized by the local battery or carrier, and closes its contacts 34 to trip the circuit breaker upon de-energization of the receiver relay.

With a system as described above in connection with Fig. 7, each protected line section will remain connected in the line if the fault lies outside the line section, and in case of a fault on the line section the carrier relay system will close the tripping circuit of the circuit breakers at the ends of the faulty section within 1 cycle, enabling high speed circuit breakers to cut out the faulty line section in about 4 cycles or less and thus preventing the otherwise intact part of the transmission line system from becoming unstable.

The lock-out relays LO at the two section ends do not affect the instantaneous protective action of the other main relays of the system because the time delay of these relays is substantially larger than the time required to clear the fault. Such lock-out relays serve to protect the line section against false tripping due to the reversal of the power flow in the line section that may occur upon the opening of the circuit breakers on an external faulty line section, or due to out-of-step conditions when synchronous apparatus in different parts of the system fall out of step with each other. In such case, the protected section would be without carrier energy due to the reversal of drectional power relays at both stations while the tripping relays are still in the closed position, and tripping of a sound line section might thus occur. The lock-out means are also effective in preventing false tripping due to out-of-step conditions which have an effect similar to an internal fault.

Such system will give reliable and rapid protection against phase to phase as well as phase to ground faults on line sections in which the ground current is more than twice the normal line current. In all such cases a single power directional relay will give the required protection, avoiding the use of more complicated systems requiring additional space, costs and supervision.

Figure 8:
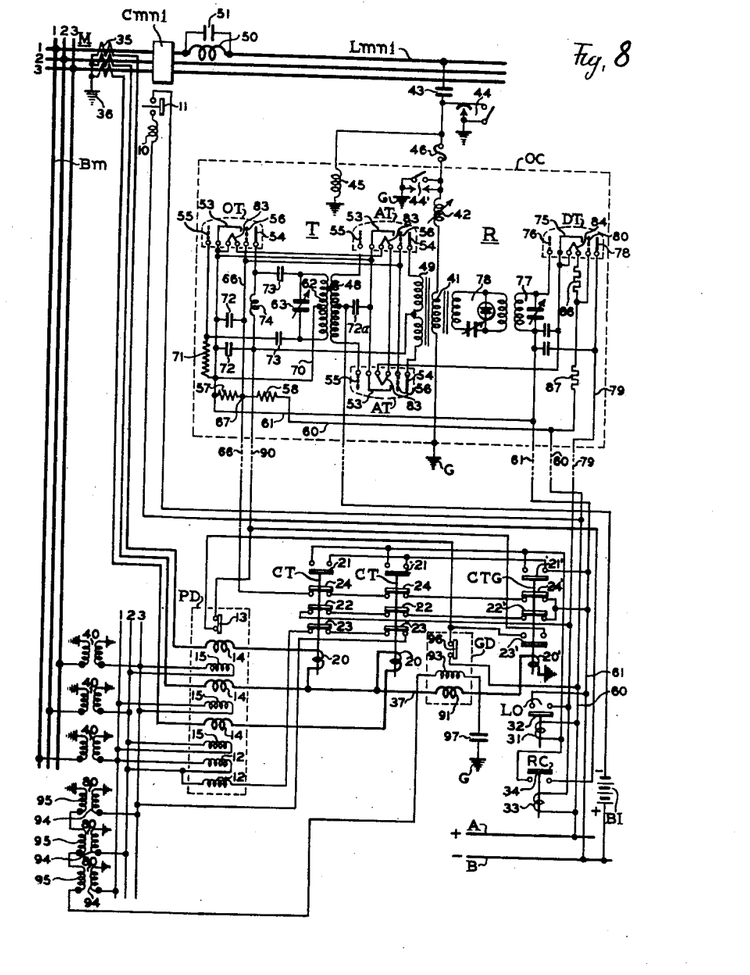

The system of protection shown in Fig. 8 supplies, in addition to the phase fault protection given by the system of Fig. 7, a more sensitive ground fault protection which is particularly important for conditions where the minimum ground fault currents are less than twice the normal load currents over the line section. As seen in Fig. 8 the power directional relay PD and the over-current relays CT are arranged and connected in the same way as the corresponding elements of the system shown in Fig. 7. There is further provided an additional ground directional relay GD which has a current coil 91 connected in the ground lead 37 of the current transformer windings 35 to be actuated by the ground currents flowing in the line.

The ground directional relay has also a potential coil 93 which in case of a ground fault has applied thereto zero sequence voltages derived from three auxiliary single-phase potential transformers 80 having primary windings 94 connected in star and secondary windings 95 connected in delta. The ground directional relay GD is arranged to be actuated to open its contacts 96 upon the flow of ground current in the direction from the bus-bars B$m$ into the line section L$mn$l and to keep the contacts 96 closed if ground current flows in opposite direction. The current coil 91 and the potential coil 93 of the ground directional relay act inductively on a disc to rotate it in one or the opposite direction depending on the direction of the ground current flow corresponding to the current and voltage applied to the actuating coils 91 and 93. A condenser 97 is provided in series with the potential coil 93 to obtain maximum torque at a predetermined power factor. Type IBC–22 directional ground relay of the General Electric Company may be used for this service.

The ground protection also includes a ground current relay CTG, similar to that used in the system of Fig. 7, which has an actuating coil 20' arranged to close its contacts 21', 23', and to open its contacts 22', 24' upon flow of predetermined currents and may be of the same type as the ground current relay used in the system of Fig. 7. The ground current relay CTG has its actuating coil 20' connected in the residual ground lead 37 and has its contacts 21', 23' normally open and contacts 22', 24' normally closed.

The carrier equipment in each station is similar to that shown in Fig. 7.

As in the system of Fig. 7, the contacts 22 and 22' of the three current relays CT, CTG connect, when closed, the actuating coil 33 of the receiver relay RC to the local battery leads 60, 61 holding the relay contacts 34 and therethrough the tripping circuit open. The actuating coil 33 of the receiver relay RC is independently energized to hold its tripping contacts 34 open if it is supplied with carrier energy from the receiver R.

The function of the phase power directional relay PD is to apply positive plate voltage from the bus-bar to the anode 54 of the oscillator OT when the contacts 13 of the power directional relay are closed, and to remove the plate voltage from the oscillator tube OT when relay contacts 13 are open.

Under normal line conditions the two phase current relays CT are in the downward position and hold open the tripping circuit of the circuit breaker C$mn$l at their open tripping contacts 21; apply a blocking potential to the screen grid 56 of the oscillator tube OT at the closed contacts 24 preventing oscillation of the tube; hold closed at their closed contacts 22 the local energizing circuit of the coil 33 of the receiver relay RC thereby holding open the receiver contacts 34 of the tripping circuit; and at their closed contacts 23 they energize one of the voltage restraint coils 12 to maintain the power directional relay contacts 13 closed so as to energize the plate circuit of oscillator tube OT.

In this arrangement the normally closed power directional relay contacts 13 and the ground directional relay contacts 96 are connected in series in the plate supply lead 90, and the normally open interlocking contacts 23' of the ground current relay CTG are connected parallel to the power directional relay contacts 13 to cut out the control of this directional relay if contacts 23' are closed. Under normal conditions positive plate voltage is thus applied from the bus-bar A to the transmitter tubes OT, AT, but they do not transmit because a blocking potential is applied to the screen grids 56 of these tubes through the lead 66 over the normally closed contacts 24, 24' of the three current relays CT, CTG.

Assuming normal line conditions and power flowing as in the system of Fig. 7 in the direction from line L$mk$l to section L$no$l, the circuit breakers at both ends of section L$mn$l will stay closed. No carrier is transmitted from either station because in both stations blocking potential is applied to the screen grid 56 of master oscillator tube OT.

If a phase to phase fault, such as a short-circuit, occurs on a line section beyond station N, the power directional relays PD, the two phase fault relays CT and the receiver relay RC will operate exactly in the way the similar relays and carrier devices of the system of Fig. 7 operated to maintain line section L$mn$l intact and prevent it from becoming disconnected from the system because of its abnormal current flow through it. If the fault lies within the line section L$mn$l, then instantaneous tripping of the circuit breakers of both stations will be produced in the same way as it is produced by the corresponding apparatus as described in connection with the system of Fig. 7. If the fault involves only the phase conductors of the line and does not involve a ground, the ground responsive relays GD and CTG are not called upon to function and remain in their normal position.

In the event of a ground fault, the instantaneously-acting ground current relay CTG is energized to close its contacts 21' and 23' and short-circuit the power directional relay contacts 13. The control of the tripping action is thus taken away from the power directional relay and the ground current relay operates in conjunction with the ground directional relay GD to protect the line section in a way similar to the operation of the plane fault responsive relays CT and PD as described in connection with Fig. 7.

Protection against false tripping because of an abnormal fault on the system, such as a reversal of power flow or out-of-step conditions, may be secured by any of the arrangements described in connection with Figs. 2 to 6.

In accordance with the arrangement of Fig. 8, the time-delay lock-out relay LO, having a normally de-energized coil 31 connected to be energized upon closure of the tripping contacts 21, 21' of either one of the instantaneous current relays CT, CTG, has normally open contacts 32 connected to establish in closed position an additional energizing circuit for the actuating coil 33 of the receiver relay RC. Thus, the lock-out relay LO will not affect the operation of the instantaneous-acting main relays of the system and will close its contacts 32 and energize the receiver relay coil 33 only after a predetermined delay of 3 to 6 cycles after the energization of its coil 31 by the tripping contacts 21, 21' of one of the instantaneous current relays CT, CTG to prevent tripping of the section that may occur due to the reversal of the power directional relays at both section ends and cessation of carrier transmission upon sudden power flow reversal.

The present invention is directed to a protective system operating in accordance with the principles explained in connection with Figs. 2 to 6 and described in detail in the embodiments of the invention shown in Figs. 7 and 8. It combines a relay arrangement which operates in response to an occurrence of a fault on the line to selectively actuate the line interrupter at the end of a protected section so as to effect fast tripping of the interrupter only if the fault is on the protected section—with abnormal fault protection means, such as the lock-out relays LO or similarly operating means, which are actuated after the interrupter opening relay arrangement has completed its fault responsive operation initiated by the occurrence of a fault without starting an interrupter opening operation to render the trip relay arrangement momentarily inoperative for starting an interrupter opening operation during a succeeding time interval, long enough to prevent tripping of the interrupter by abnormal fault conditions, if a fault condition still exists on the system; and to restore the operative condition of the interrupter trip means so that they shall be ready to clear a real fault in the section if such fault should occur in the course of the short interval during which the trip relay arrangement was incapable of effecting an interrupter opening operation.

No special devices or relays are required for operating the protective system of the invention. One of the great advantages of the protective system of the invention is the fact that it makes possible fast and positive clearing of a faulty transmission line section without the disturbance of the system by the use of devices and relays long known for great reliability in construction and performance. However, it also makes possible to accomplish the fast protective action with other devices and relaying means heretofore not considered reliable enough for transmission line protection.

The exemplifications of the present invention claimed herein will suggest to those skilled in the art many other arrangements and ways for establishing a normal opening preventive action which is eliminated on the occurrence of a fault, but is nevertheless selectively restored if the fault is outside the line section to secure fast protective action in accordance with the principles of the invention.

It is accordingly desired that the appended claims be given a broad construction commensurate with the scope of the invention.

We claim:

1. In a control system for a circuit interrupter interconnecting two electric power circuits which includes a control circuit and means responsive to the energization of the control circuit for opening said interrupter, a relay having contacts in said control circuit which are open when the relay is energized, two energizing circuits for said relay, fault responsive means for normally completing one of said energizing circuits connected to respond to a fault on either of said power circuits, means responsive to a fault on a predetermined one of said power circuits for effecting the energization of the other of said energizing circuits, and means responsive to a fault on said predetermined power circuit for producing after a predetermined time interval another opening in said control circuit and for maintaining said control circuit open until a predetermined time after the termination of the fault on said predetermined power circuit.

2. In a control system for a circuit interrupter interconnecting two electric power circuits which includes a control circuit and means responsive to the energization of the control circuit for opening said interrupter, a relay having contacts in said control circuit which are open when the relay is energized, two energizing circuits for said relay, fault responsive means connected to respond to a fault on either of said power circuits and having normally closed contacts completing one of said energizing circuits and normally open contacts in said control circuit, means responsive to a fault on a predetermined one of said power circuits for effecting the energization of the other of said energizing circuits, and means having normally closed contacts in said control circuit and jointly controlled by said relay and said fault responsive means operative on the occurrence of a fault on said predetermined power circuit to open its contacts in the control circuit after a predetermined time and to maintain them open until a predetermined time after the termination of the fault on said predetermined power circuit.

3. In a protective system for a section of an electric power transmission line having circuit interrupting means at one end for disconnecting the section from the line, a circuit for controlling the opening of said interrupting means, a fault responsive relay connected to be energized from said line, means controlled by said fault responsive relay for normally maintaining said control circuit in the non-opening condition operative on the occurrence of a fault to tend to establish the opening condition of said control circuit, normally inactive means for preventing said maintaining means from effecting the opening condition of said control circuit when the fault occurs outside of said section, and means controlled by said fault responsive relay for preventing the opening condition of said control circuit from being established for an interval beginning shortly after the section condition presents the appearance of a fault and continuing for a definite time after the disappearance of said condition.

4. In a protective system for a section of an electric power transmission line having circuit interrupting means at one end for disconnecting the section from the line, a circuit for controlling the opening of said interrupting means, a fault responsive relay connected to be energized from said line, means controlled by said fault responsive relay for normally maintaining said control circuit in the non-opening condition operative on the occurrence of a fault to tend to establish the opening condition of said control circuit, normally inactive means for preventing said maintaining means from effecting the opening condition of said control circuit when the fault occurs outside of said section, and means jointly controlled by said fault responsive relay and said maintaining means for preventing the opening condition of said control circuit from being established for an interval beginning shortly after the section condition presents the appearance of a fault and continuing for a definite time after the disappearance of said condition.

5. In a protective system for a section of an electric power transmission line having circuit interrupting means at one section end for disconnecting the section from the line, a control circuit for said interrupting means, fault responsive means connected to be energized from said line, means controlled by said fault responsive means for normally maintaining said control circuit in one condition of energization operative to tend to change the condition of energization of the control circuit on the occurrence of a fault condition, normally inactive means for preventing said maintaining means from changing the condition of energization of the control circuit when a fault occurs outside of said section, and means controlled by said fault responsive means operative on the occurrence of a response thereof to prevent a change in the condition of energization of the control circuit for an interval beginning shortly after the section condition presents the appearance of a fault and continuing for a definite time after the disappearance of said condition.

6. In a protective system for a section of an electric power transmission line having interrupting means at one section end for disconnecting the section from the line, a control circuit for said interrupting means, fault responsive means connected to be energized from said line, means controlled by said fault responsive means for normally maintaining said control circuit in one condition of energization operative to tend to change the condition of energization of the control circuit on the occurrence of a fault condition, normally inactive means for preventing said maintaining means from changing the condition of energization of the control circuit when a fault occurs outside of said section, and means conjointly controlled by said fault responsive means and said maintaining means operative on the occurrence of a fault outside of said section to prevent a change in the condition of energization of the control circuit while the section condition presents the appearance of an external fault and for a definite time thereafter after the disappearance of said external fault.

7. In a protective system for a section of an electric power line having circuit interrupting means at one section end for disconnecting a section from the line, an auxiliary circuit for effecting the opening of said interrupting means, three serially related switching means for controlling said auxiliary circuit, two of said switch-means normally being in a non-circuit completing condition and the third of the switching means normally being in a circuit completing condition, line energized fault responsive relay means for controlling one of said two switching means, circuit interrupter opening preventive means controlled by said fault responsive relay means for controlling the other of said two switching means, means for further controlling said circuit interrupter opening preventive means in dependence on the relative directions of energy flow at the ends of the section, and means controlled by said fault responsive means for effecting the actuation of the third of said switching means to a non-circuit completing condition on the occurrence of a fault outside of said section.

8. In a protective system for a section of an electric power line having circuit interrupting means at one section end for disconnecting the section from the line, an auxiliary circuit for effecting the opening of said interrupting means, three serially related switching means for controlling said auxiliary circuit, line energized fault responsive relay means for controlling one of said switching means, circuit interrupter opening preventive means controlled by said fault responsive relay means for controlling another of said switching means, means for further controlling said circuit interrupter opening preventive means in dependence on the relative directions of energy flow at the ends of the section, and means jointly controlled by said fault responsive means and said circuit interrupter opening preventive means to control the third of said switch means operative on the occurrence of a fault outside of said section to prevent the opening of said interrupter means while the section condition presents the appearance of an external fault and for a definite time thereafter.

9. In combination an alternating current power line, means for interrupting the line at each of two points thereof, means for transmitting a control current from each of said points to the other, line energized fault responsive means at each of said points for controlling the opening of the associated interrupting means, said fault responsive means including means for effecting the operation of said transmitting means under predetermined directions of energy flow at said points, means at each of said points connected to be controlled by said fault responsive means and said transmitted currents for preventing the fault responsive means at each point from effecting the opening of the associated interrupter means on the occurrence of a line fault outside of the portion of the line between said points, and means controlled by said fault responsive means operative on the occurrence of a response thereof to prevent the opening of said interrupting means for an interval beginning shortly after said portion presents the appearance of a fault and continuing for a definite time after the disappearance of said fault.

10. In a protective system for a section of an electric power line having circuit interrupting means at one section end for disconnecting a section from the line, an auxiliary circuit for effecting the opening of said interrupting means, three serially related switching means for controlling said auxiliary circuit, two of said switching means normally being a non-circuit completing condition and the third of the switching means normally being in a circuit completing condition, line energized fault responsive relay means for controlling one of said two switching means, circuit interrupter opening preventive means controlled by said fault responsive relay means for controlling the other of said two switching means, means for further controlling said circuit interrupter opening preventive means in dependence on the relative directions of energy flow at the ends of the section, means conjointly controlled by said fault responsive means and said circuit interrupter opening preventive means for effecting the actuation of the third of said switching means to a non-circuit completing condition on the occurrence of a fault outside of said section, and means including said relative directions of energy flow controlled means for restoring said third switching means to its circuit completing condition on the occurrence of an internal fault independently of the existence of an external fault.

11. In a control system for a circuit interrupter interconnecting two electric power circuits, means for controlling the opening of said interrupter including control means actuable to an interrupter opening condition and to an interrupter non-opening condition, fault responsive means for normally maintaining said control means in the interrupter non-opennig condition connected to respond to a fault on either of said power circuits when said interrupter is closed to permit the actuation of said control means to the interrupter opening condition, means responsive to a fault on a predetermined one of said power circuits for maintaining said control means in the interrupter non-opening condition, and cooperating control means normally in an interrupter opening condition actuable to an interrupter non-opening condition a predetermined time after the occurrence of a fault on said predetermined power circuit to remain in said interrupter non-opening condition until a predetermined time after the termination of the fault on said predetermined power circuit.

12. In a protective system for a section of an electric power transmission line having an interrupter at one section end for disconnecting the switch from the line, operating means for controlling the opening of said interrupter including control means actuable to an interrupter opening condition and to an interrupter non-opening condition, fault responsive relay means connected to be energized from the line for normally maintaining said control means in the interrupter non-opening condition operative to tend to change the condition of said control means on the occurrence of a fault on the line, normally inactive means for maintaining said control means in the interrupter non-opening condition when a fault occurs outside of said section, and means controlled by said fault responsive relay means and said control means operative on the occurrence of a fault outside of said section to prevent the opening of said interrupter while the section presents the appearance of an external fault and for a definite time after the disappearance of said external fault.

PHILIP SPORN.
CHARLES ALBERT MULLER.

CERTIFICATE OF CORRECTION.

Patent No. 2,164,182. June 27, 1939.

PHILIP SPORN, ET AL.

It is hereby certified that error appears in the printed specification of the above numbered patent requiring correction as follows: Page 2, second column, line 8, for "couplng" read coupling; line 58, for "casing" read causing; page 5, first column, line 71, for "magniture" read magnitude; page 6, first column, line 53, for "and" read an; page 8, first column, line 32, after "is" insert thus; same page, second column, line 56, for "drectional" read directional; page 11, first column, line 52, claim 7, for "switch-" read switching; same page, second column, line 11, claim 8, for "switch" read switching; line 48, claim 10, after "being" insert in; page 12, first column, line 3, claim 11, for "non-opennig" read non-opening; line 22, claim 12, for the word "switch" read section; and that the said Letters Patent should be read with this correction therein that the same may conform to the record of the case in the Patent Office.

Signed and sealed this 8th day of August, A. D. 1939.

(Seal)

Leslie Frazer,
Acting Commissioner of Patents.